(12) United States Patent
Blundell

(10) Patent No.: US 12,104,641 B2
(45) Date of Patent: Oct. 1, 2024

(54) RETENTION WASHERS, PROPELLER RETENTION SYSTEMS, AND RELATED METHODS

(71) Applicant: Insitu, Inc., Bingen, WA (US)

(72) Inventor: Chad Nichols Blundell, White Salmon, WA (US)

(73) Assignee: Insitu, Inc., a subsidiary of The Boeing Company, Bingen, WA (US)

( * ) Notice: Subject to any disclaimer, the term of this patent is extended or adjusted under 35 U.S.C. 154(b) by 957 days.

(21) Appl. No.: 16/909,027

(22) Filed: Jun. 23, 2020

(65) Prior Publication Data
US 2021/0396269 A1    Dec. 23, 2021

(51) Int. Cl.
  *F16B 39/24*        (2006.01)
  *F16B 43/00*        (2006.01)
(52) U.S. Cl.
  CPC ............ *F16B 43/003* (2013.01); *F16B 39/24* (2013.01)
(58) Field of Classification Search
  CPC ........ F16B 43/003; F16B 39/24; F16B 39/10; F16B 39/101; F04D 29/26; F04D 29/263; F04D 29/266; F04D 29/32; F04D 29/601; F04D 29/644; F04D 29/646; F01D 5/025; F01D 5/02; F01D 5/021; B64C 11/02; B64C 11/04
  USPC ................................ 411/190, 119, 120, 102
  See application file for complete search history.

(56) References Cited

U.S. PATENT DOCUMENTS

| | | | | |
|---|---|---|---|---|
| 1,445,142 | A * | 2/1923 | Kirkham | B64C 11/04 403/334 |
| 2,245,251 | A * | 6/1941 | Chilton | B64C 11/04 416/155 |
| 2,423,918 | A * | 7/1947 | Wohlhieter | F16B 39/101 411/979 |
| 2,655,998 | A * | 10/1953 | Martin | B64C 11/303 416/47 |
| 3,130,677 | A * | 4/1964 | Liebhart | B64C 11/065 239/171 |

(Continued)

FOREIGN PATENT DOCUMENTS

| | | | | |
|---|---|---|---|---|
| CA | 2734659 A1 * | 9/2012 | ............ | B60B 30/08 |
| GB | 2352012 A * | 1/2001 | ............. | F16B 37/14 |

(Continued)

*Primary Examiner* — William D Hutton, Jr.
*Assistant Examiner* — Dil K. Magar
(74) *Attorney, Agent, or Firm* — Kolitch Romano Dascenzo Gates LLC

(57) ABSTRACT

Retention washers include a washer body having a first side and a second side opposite the first side. The washer body has a perimeter having one or more lobes, and the retention washer further includes a multi-point star-shaped hole extending through the washer body from the first side to the second side. The retention washer is configured to maintain an installation torque of an installed nut when the retention washer is positioned such that the hole circumscribes the nut. Systems for retaining a propeller assembly on a shaft may include a nut installed on a bolt, and a retention washer positioned such that the hole of the retention washer circumscribes the nut, thereby limiting rotation of the nut with respect to the bolt and retaining the nut on the bolt. The system may include a circular array of nuts and bolts, each nut having a respective retention washer positioned thereon.

9 Claims, 5 Drawing Sheets

(56) References Cited

U.S. PATENT DOCUMENTS

| | | | | | |
|---|---|---|---|---|---|
| 3,285,312 | A | * | 11/1966 | Dison | F16K 35/00 411/945 |
| 3,702,707 | A | * | 11/1972 | Rosan, Sr. | F16L 19/005 285/23 |
| 3,875,985 | A | * | 4/1975 | Okuda | F16B 39/10 411/974 |
| 4,734,001 | A | * | 3/1988 | Bennett | F16B 39/10 411/119 |
| 4,906,150 | A | * | 3/1990 | Bennett | F16B 39/10 411/432 |
| 4,976,576 | A | * | 12/1990 | Mahaney, Jr. | F16B 39/10 411/129 |
| 5,232,323 | A | * | 8/1993 | Baehre | F16B 39/10 411/271 |
| 5,573,378 | A | * | 11/1996 | Barcza | F02C 7/04 411/970 |
| 6,450,746 | B1 | * | 9/2002 | Kirimoto | F16B 39/101 411/95 |
| 6,637,993 | B2 | * | 10/2003 | Murakami | F16B 5/0208 411/353 |
| 7,604,460 | B2 | * | 10/2009 | Mestre | B64C 27/33 416/134 A |
| 7,731,463 | B2 | * | 6/2010 | Davis | F16B 39/10 411/119 |
| 7,927,049 | B2 | * | 4/2011 | Adams | F16B 37/14 411/102 |
| 8,337,129 | B2 | * | 12/2012 | Boyce | F16B 31/028 411/102 |
| 8,469,460 | B2 | * | 6/2013 | Martin, III | F16C 19/548 301/124.1 |
| 8,628,312 | B2 | * | 1/2014 | Bergman | F04C 18/0215 411/533 |
| 10,533,600 | B1 | * | 1/2020 | Jackson | B60B 3/165 |
| 2002/0031416 | A1 | * | 3/2002 | Illes | F16B 39/101 411/87 |
| 2004/0156693 | A1 | * | 8/2004 | Paakko | B25B 23/00 411/102 |
| 2007/0104580 | A1 | * | 5/2007 | Mestre | B64C 27/48 416/134 A |
| 2009/0060674 | A1 | * | 3/2009 | Kluga | B21D 53/20 470/42 |
| 2009/0148253 | A1 | * | 6/2009 | de Groot | F16B 39/22 411/204 |
| 2013/0207447 | A1 | * | 8/2013 | De Lima | F16B 39/101 301/9.1 |
| 2016/0290167 | A1 | * | 10/2016 | Porter | F01D 9/065 |
| 2017/0356485 | A1 | * | 12/2017 | Ziskovsky | F16H 57/12 |
| 2019/0323547 | A1 | * | 10/2019 | Yuan | F16B 43/001 |

FOREIGN PATENT DOCUMENTS

| | | | | |
|---|---|---|---|---|
| GB | 2412406 | A | * 9/2005 | F16B 39/10 |
| GB | 2452232 | A | * 3/2009 | F16B 39/10 |
| WO | WO-8908207 | A | * 9/1989 | F16B 39/10 |
| WO | WO-02101249 | A1 | * 12/2002 | B25B 23/00 |
| WO | WO-2011027164 | A1 | * 3/2011 | F16B 39/101 |
| WO | WO-2016122011 | A1 | * 8/2016 | |
| WO | WO-2016168883 | A1 | * 10/2016 | B60B 3/16 |
| WO | WO-2019109292 | A1 | * 6/2019 | F16B 39/10 |

* cited by examiner

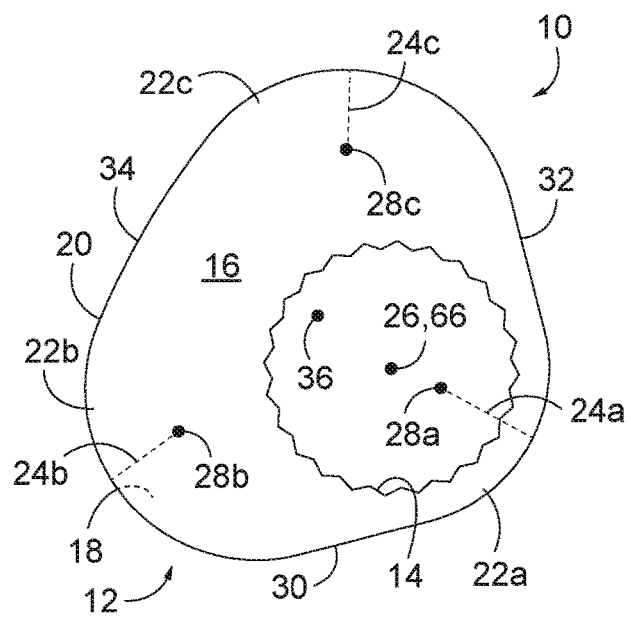
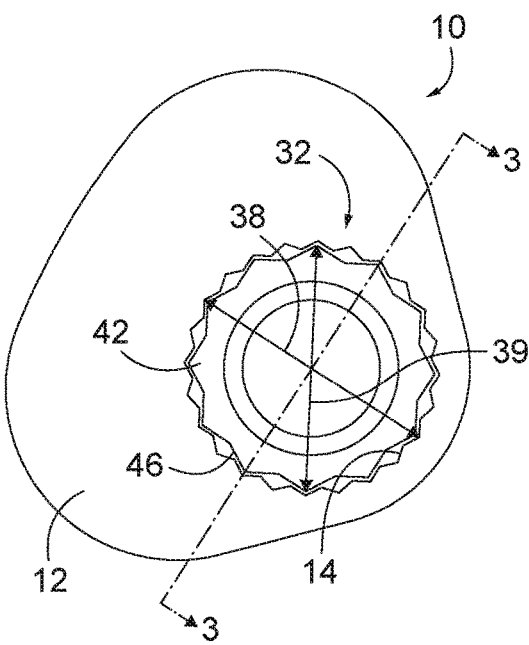
FIG. 1   FIG. 2
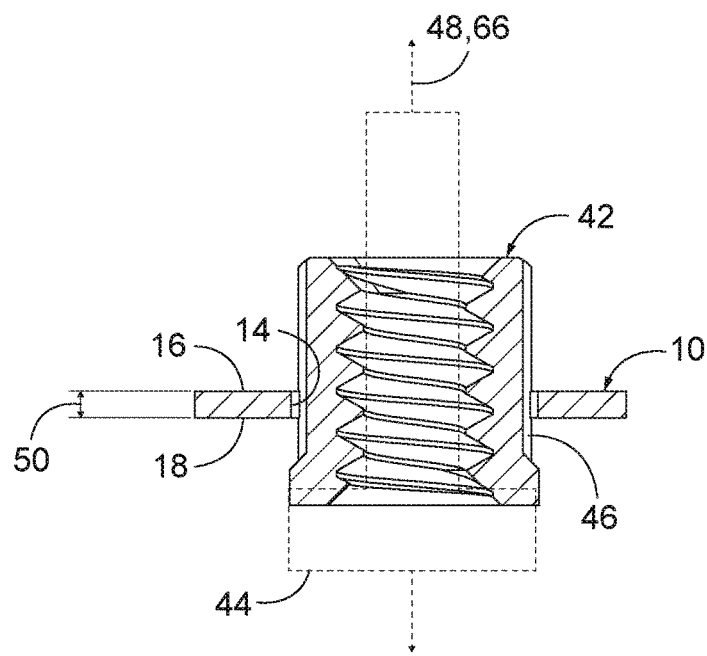
FIG. 3

RETENTION WASHERS, PROPELLER RETENTION SYSTEMS, AND RELATED METHODS

FIELD

The present disclosure relates generally to retention washers, propeller retention systems, and related methods.

BACKGROUND

A challenge in many industries is the retention of nuts on bolts in applications where the fasteners are subjected to cyclic loads while performing. Over time, nuts may loosen due to vibrations and/or cyclic loads, which may result in breakage of parts and/or affect performance of the apparatus. Existing solutions may not be useful in some applications and/or may be associated with one or more significant drawbacks. For example, lock washers and fold-over washers often are not sufficiently effective. In addition, they introduce extra consumable parts, which can increase complexity in designs and also increase costs for the apparatus. Furthermore, other consumable solutions such as the use of a lockwire or wire tie often require custom tools for proper installation and removal. In addition, some practical applications may not be able to accommodate lockwire due to limited design space.

Other examples of nut retention include the use of glue, Loctite, or other adhesives to hold the nut in place. However, these solutions also do not lend themselves to reliable and consistent removal and replacement. Removal of such adhesives can strip threads, be difficult to apply, require skill to assemble, and/or prove difficult to visualize or verify whether the adhesive has been applied correctly and sufficiently. Furthermore, such solutions may not be scalable to smaller aircraft such as many unmanned aircraft. Yet other existing solutions for nut retention may not be useful in many practical applications. For example, nyloc nuts may not be practical for use in applications that are exposed to heat, chemicals, and/or foreign object debris. Yet other existing solutions do not provide redundancy of retention, and/or are not suitable for cyclic loads or extreme forces.

Simply put, many situations require repeated removal of fasteners by unskilled technicians in a quick and repeatable manner while still providing a means of retaining nuts on bolts subjected to vibrations, extreme forces, and/or cyclic loads. In a specific example, propeller assemblies may need to be removed and replaced often in the field for different tasks, potentially with different people changing them out each time. Existing means for retention of nuts on these propeller assemblies do not lend themselves to these scenarios because they often are not quick or simple to remove and replace, and/or may not be useful due to design constraints or other environmental factors. There thus remains a need for ways of retaining nuts on fasteners that can address these and other limitations of the prior art.

SUMMARY

Presently disclosed retention washers and systems for retaining nuts on fasteners may be configured to provide quick and repeatable installations with a threshold level of retention and visual cues to verify proper installation, all while being configured to be installed by those without any specific training or skill set.

One example of a retention washer includes a washer body having a first side and a second side opposite the first side. The washer body has a perimeter having one or more lobes, and a hole extends through the washer body from the first side to the second side. The hole is a multi-point star-shaped hole, and the retention washer may be configured to maintain an installation torque of an installed nut when the retention washer is positioned such that the hole circumscribes the nut. Disclosed systems for retaining nuts on a fastener may be used, for example, for retaining a propeller assembly on a shaft. Said systems may include a nut installed on a fastener, such as a stud or a bolt, wherein the nut and the stud are configured to retain the propeller assembly on the shaft, and a retention washer positioned such that a hole of the retention washer circumscribes the nut, thereby limiting rotation of the nut with respect the stud and retaining the nut on the stud.

Related methods are also disclosed. For example, a method of propeller retention may include applying a nut onto a stud within a predetermined range of a prescribed installation torque, wherein the nut and the stud are configured to retain a propeller assembly on a shaft, and positioning a retention washer with respect to the nut such that a hole of the retention washer circumscribes the nut. Said positioning of the retention washer on the nut may limit rotation of the nut with respect to the stud and maintain the nut at a torque within the predetermined range of the prescribed installation torque. Generally, the positioning the retention washer includes translating the retention washer axially along a longitudinal axis of the stud in order to position the retention washer with respect to the nut such that the hole circumscribes the nut.

BRIEF DESCRIPTION OF THE DRAWINGS

FIG. 1 is a top plan view of an example of a retention washer according to the present disclosure.

FIG. 2 is a top plan view of an example of a system according to the present disclosure, with the retention washer of FIG. 1 positioned on a nut.

FIG. 3 is side elevation view of the system of FIG. 2.

DESCRIPTION

Figure 4:
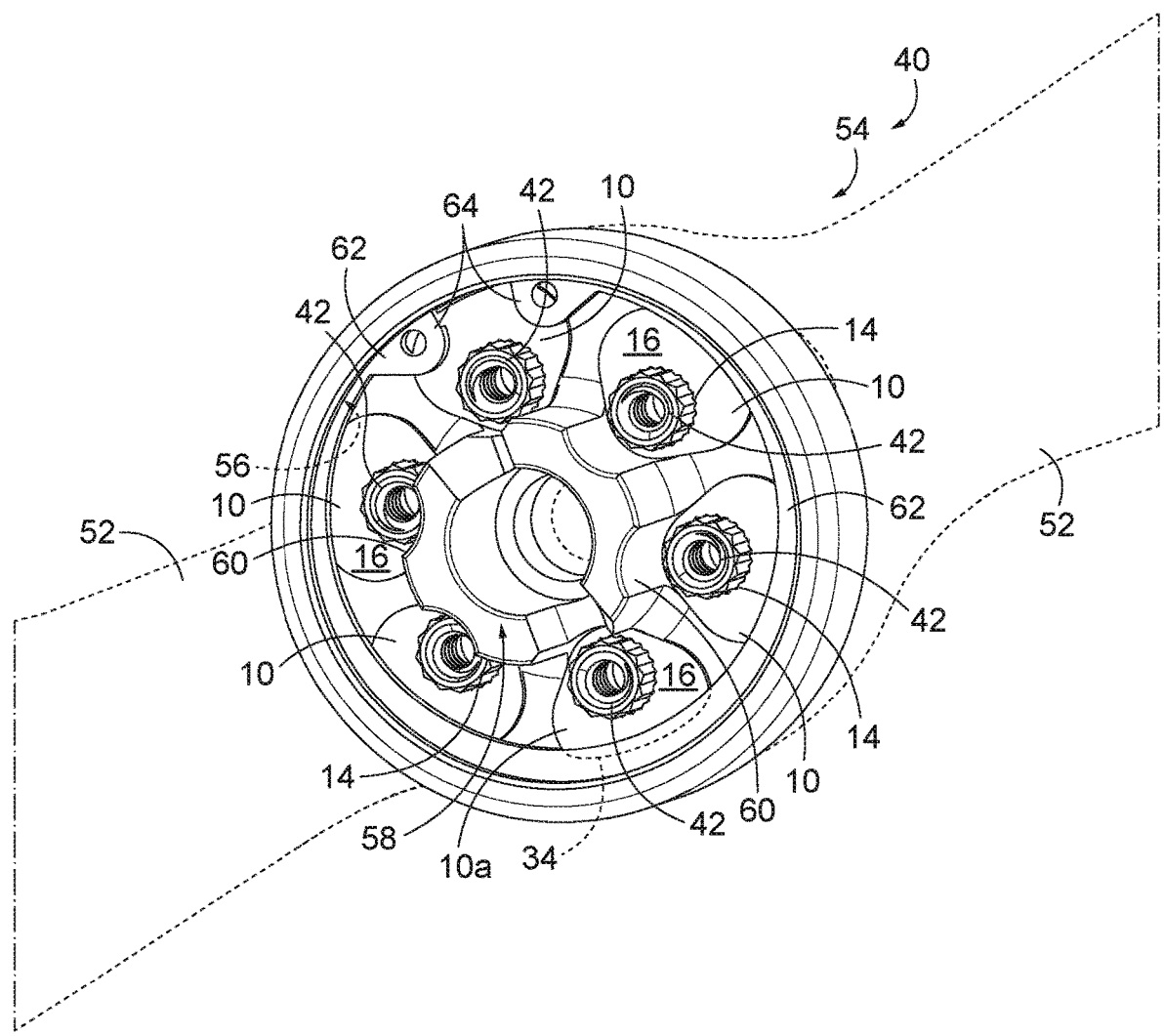
FIG. 4 is a perspective view of an example of a propeller assembly secured via a hub assembly that includes a plurality of retention washers according to the present disclosure.

In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular example without departing from the scope of the present disclosure.

FIG. 1 shows an example of a retention washer 10 according to the present disclosure. Retention washer 10 includes a washer body 12 and a hole 14 extending through washer body 12. Washer body 12 has a first side 16, a second side 18 opposite first side 16, and a perimeter 20. Perimeter 20 generally includes one or more curved portions, or lobes 22. For example, retention washer 10 in FIG. 1 includes a first lobe 22a, a second lobe 22b, and a third lobe 22c. Other examples of retention washer 10 may include more or fewer lobes 22 than the example shown in FIG. 1. Hole 14 is a polygonal hole, and generally is a multi-point star-shaped hole 14 having straight portions and angled portions creating the shape of hole 14. Retention washer 10 is configured to maintain a prescribed torque of an installed nut (e.g., nut 42 of FIG. 2) when retention washer 10 is positioned such that hole 14 circumscribes the nut. For example, retention washer 10 may be configured to maintain a prescribed torque that is within 5% of an installation torque of nut 42. As used herein, the "installation torque" is the torque at which nut 42 was installed onto a fastener, such as a bolt or stud, whether installed manually by a technician or user, or installed automatically by a robot or other machine. The prescribed torque may be at least substantially maintained by retention washer 10 without the use of Loctite, lockwire, or other consumables, in some examples. If desired, however, Loctite, lockwire, and/or other consumables may be used in combination with retention washer 10.

Hole 14 may be sized and shaped relative to the nut that retention washer 10 is configured to retain. For example, in the case of a 12-point nut, hole 14 is a 24-point star-shaped hole. Hole 14 may be configured (e.g., sized and shaped) with respect to the nut it is intended to retain such that retention washer 10 is configured to restrict and/or prevent rotation of the installed nut with respect to retention washer 10. In a specific example, retention washer 10 may be configured to restrict and/or prevent rotation of a nut (e.g., nut 42 of FIG. 2). In a specific example, retention washer 10 is configured to restrict rotation of a nut such that the nut is prevented from rotating more than 7.8 degrees with respect to a bolt or other fastener to which the nut is fastened (e.g., stud 44 of FIG. 3).

Perimeter 20 generally has one or more radii of curvature 24 corresponding to each lobe 22. For example, perimeter 20 may have a first radius of curvature 24a corresponding to lobe 22a, perimeter 20 may have a second radius of curvature 24b corresponding to lobe 22b, and perimeter 20 may have a third radius of curvature 24c corresponding to lobe 22c. In some examples, each radii of curvature 24 may be substantially equal to one another. In some examples, one or more radii of curvature 24 may be different from one or more other radii of curvature 24. For example, in a specific example, second radius of curvature 24b may be at least substantially equal to third radius of curvature 24c, while first radius of curvature 24a may be different from second radius of curvature 24b and/or third radius of curvature 24c.

A center point 26 of hole 14 may be at least substantially equidistant from a second center 28b of second radius of curvature 24b and from a third center 28c of third radius of curvature 24c. On the other hand, center point 26 of hole 14 may be closer to a first center 28a of first radius of curvature 24a than it is to second center 28b or third center 28c. However, center point 26 of hole 14 may be different from a washer center point 36 of retention washer 10.

Perimeter 20 may include a first edge 30, a second edge 32, and a third edge 34. In some examples, perimeter 20 may include more edges than is shown in the example of FIG. 1. First edge 30 may be between first lobe 22a and second lobe 22b, second edge 32 may be between first lobe 22a and third lobe 22c, and third edge 34 may be between second lobe 22b and third lobe 22c. In other words, perimeter 20 may have straight portions (edges 30, 32, and 34) positioned between curved portions corresponding to lobes 22 and radii of curvature 24. In some examples, a first length of first edge 30 may be at least substantially equal to a second length of second edge 32, while a third length of third edge 34 may be greater than the first length and/or the second length. Other arrangements are also within the scope of the present disclosure.

One or more of lobes 22 and/or one or more of edges 30, 32, 34 may be configured to engage an external structure and thereby restrict and/or prevent rotation of retention washer 10 with respect to the external structure. For example, one or more of lobes 22 may be configured to restrict and/or prevent rotation of retention washer 10 about a transverse axis 66 extending through center point 26 of hole 14, by engagement between lobe 22 and the external structure. Transverse axis 66 may be at least substantially concentric with an axis of rotation of the installed nut (e.g., longitudinal axis 48 of nut 42, as shown in FIGS. 2-3). In some examples, first lobe 22a may be engaged with the external structure in such a way that rotation of retention washer 10 with respect to the external structure is restricted and/or at least substantially prevented. Additionally or alternatively, third edge 34 may be engaged with the external structure in such a way that rotation of retention washer 10 with respect to the external structure is restricted and/or at least substantially prevented. In other words, one or more lobes 22 and/or one or more edges 30, 32, 34 may be configured to act as a cam.

Washer body 12 may be formed of any suitable material, examples of which may include stainless steel, other steels, aluminum, plastics, a composite material (e.g., polymer reinforced carbon fiber), wood, and/or metal alloys. In various examples, materials may be selected based on the application of retention washer 10. For example, stainless steel retention washers 10 may be useful for marine applications, aluminum retention washers 10 may be useful for applications where reducing weight is desirable, or plastics may be useful for retention washers 10 used in medical and/or low torque applications. Retention washers 10 may be manufactured, or made via any suitable technique, with examples including but not limited to forming, stamping, laser cutting, water jet cutting, machining, and/or additive manufacturing (e.g., 3D printing).

First side 16 and/or second side 18 of washer body 12 of retention washer 10 may be surface treated, surface coated, and/or textured in some examples. For example, first side 16 may be surface coated, subject to surface abrasion, and/or textured. Additionally or alternatively, second side 18 may be surface coated, subject to surface abrasion, and/or textured. In one specific example, first side 16 and/or second side 18 may be nitrate bath coated. Additionally or alternatively, washer body 12 may be surface treated and/or formed such that it has a particular minimum hardness or to be within a range of desired hardness. For example, washer body 12 has a hardness of between 42 and 62 on the Rockwell C scale, in some examples. Additionally or alternatively, washer body 12 may be tempered, toughened, and/or corrosion resistant. In other words, retention washer 10 may be surface treated to increase its hardness, and/or to prevent or reduce wear (e.g., of the shape of hole 14).

Figure 5:
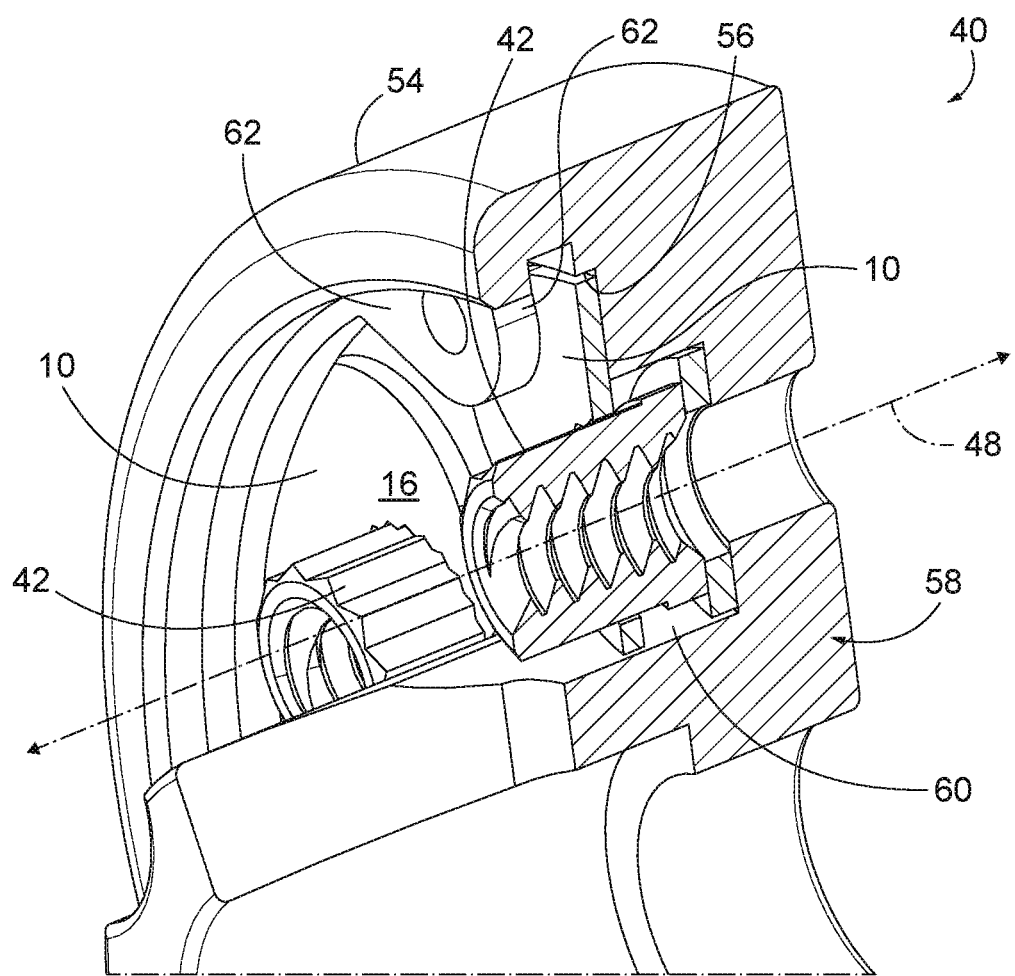
FIG. 5 is a perspective, partial cutaway view of a portion of a hub assembly having a plurality of retention washers according to the present disclosure.

A system 40 according to the present disclosure generally includes retention washer 10 positioned such that hole 14 circumscribes a nut 42 installed on a fastener, such as a bolt or stud 44, as illustrated in FIGS. 2-3. Nut 42 and stud 44 may be configured for retention of a propeller assembly on a shaft (an example of which is illustrated in FIGS. 4-5). In other examples, nut 42 and stud 44 may be configured for other applications, such as for any application in which retention of a nut is desirable. Systems 40 may include a plurality of nuts 42 and a plurality of studs 44, and generally include a respective retention washer 10 for each respective nut 42. Hole 14 is shaped and sized with respect to an outer perimeter 46 of nut 42 such that hole 14 engages with outer perimeter 46 and thereby limits rotation of nut 42 with respect to stud 44. In this manner, retention washer 10 retains nut 42 on the shaft of stud 44 because nut 42 may be at least substantially unable to rotate and loosen with respect to stud 44 in use (e.g., due to vibrations or cyclic loads on nut 42).

Retention washer 10 may be configured to slide over outer perimeter 46 of nut 42 in some examples. For example, retention washer 10 may be positioned on nut 42 by translating retention washer 10 axially along longitudinal axis 48 of stud 44. Generally, a thickness 50 of washer body 12 is entirely positioned on outer perimeter 46 of nut 42. In an example, retention washer 10 may have a press fit between hole 14 and nut 42. In another example, retention washer 10 may have a slip fit (which also may be referred to as a clearance fit) between hole 14 and nut 42. For example, an inner diameter 38 of hole 14 may be sized with respect to nut 42 such that hole 14 is slightly bigger than an outer diameter 39 of nut 42 that engages with hole 14 (corresponding to outer perimeter 46 of nut 42). In this manner, retention washer 10 is selectively removable from nut 42, by sliding retention washer 10 off of nut 42, along longitudinal axis 48. Removal of retention washer 10 generally does not damage or impact other parts or components in the assembly. Nut 42 generally is only engaged with hole 14 of retention washer 10, and does not engage or contact first side 16 or second side 18 of retention washer 10. In other words, retention washer 10 acts to retain nut 42 on stud 44 via the shape of hole 14 with respect to shape of outer perimeter 46 of nut 42, rather than exerting any sort of compressive forces on the edges of nut 42 via first side 16 or second side 18 of retention washer 10. This is different than with conventional washers, which are positioned between nuts and other fastening components, such that one side of the conventional washer contacts the nut. The holes extending through conventional washers are large enough to be positioned on the shaft of a bolt, but they are not configured to be placed to circumscribe the nut.

Figure 6:
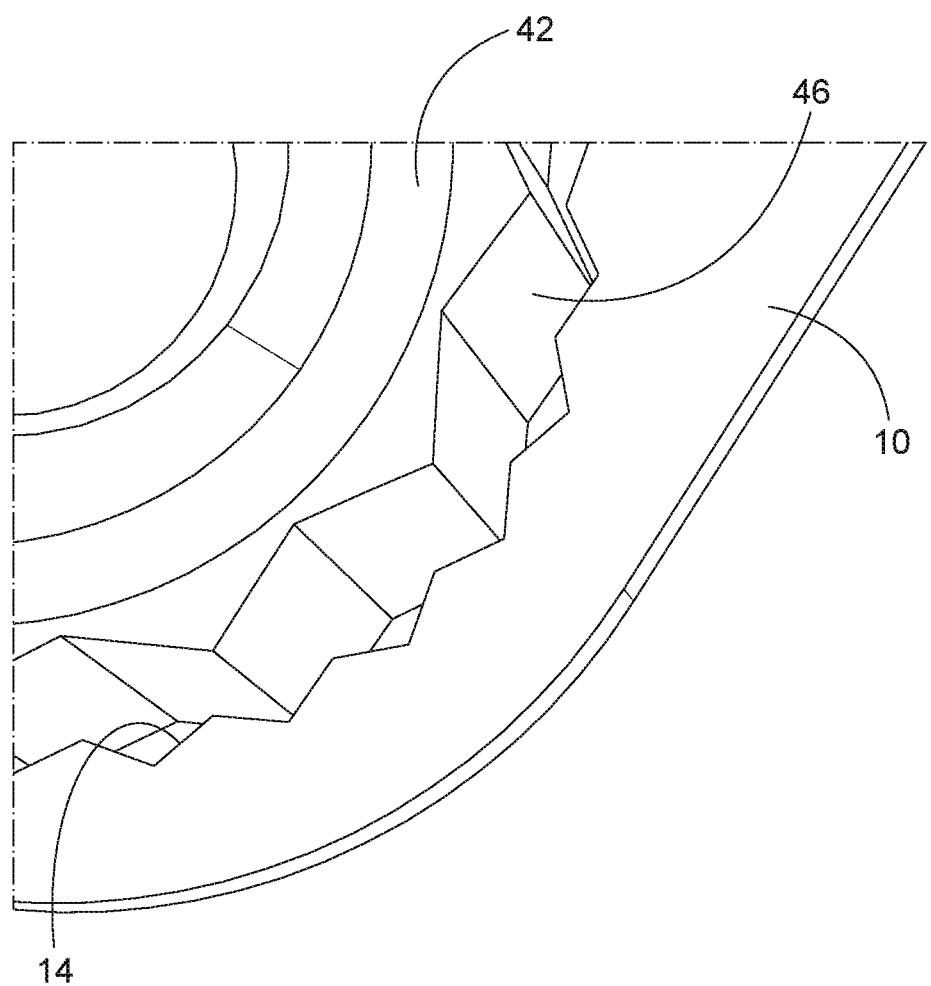
FIG. 6 is a close-up view of a portion of a retention washer according to the present disclosure, shown in engagement with a nut.

Outer perimeter 46 generally has a polygonal cross-sectional shape. For example, nut 42 in FIG. 2 is a 12-point nut, with outer perimeter 46 having a 12-point star cross-sectional shape. In this example, each point of the 12-point nut 42 is spaced apart by 30 degrees. In examples where retention washer 10 has a 24-point star shaped hole 14, each point of the 24-point hole is spaced apart by 15 degrees. Retention washer 10 may be configured to allow for substantially zero or only a small amount of rotation when placed on nut 42, due to the spacing of the points of hole 14 in relation to the points of nut 42. Manufacturing tolerances and clearance may result in a small amount of rotation between nut 42 and retention washer 10, however. In a specific example, retention washer 10 and nut 42 may index 7.5 degrees, within an overlap of 0.3 degrees, thus providing 7.8 degrees freedom for assembly. While retention washer 10 may be positioned on nut 42 in a plurality of different orientations when nut 42 and retention washer 10 are located apart from any assembly with which they are utilized (e.g., a hub assembly 54 as shown in FIGS. 4-5), the assembly may prescribe an orientation of retention washer 10 as will be described in more detail below in connection with FIGS. 4-5. FIG. 6 illustrates a close-up view of a portion of system 40, showing the engagement between nut 42 and hole 14 of retention washer 10.

FIGS. 4 and 5 illustrate an example of system 40 as used to retain a propeller assembly 52 on a shaft, such as an engine shaft (not shown). System 40 includes a hub assembly 54 that is engaged with propeller assembly 52. Hub assembly 54 may include a machined bore 56 configured to engage retention washer 10 (or a plurality of retention washers 10). For example, third edge 34 of each retention washer 10 may be engaged with machined bore 56 such that retention washer 10 is restricted and/or prevented from rotating about transverse axis 66 (FIG. 1) with respect to hub assembly 54. In other words, third edge 34 may effectively function as a cam shape that engages an internal surface of hub assembly 54. The engagement of the cam shape of retention washer 10 and the internal surface of hub assembly 54 is configured to prevent or restrict rotation of retention washer 10 about transverse axis 66 (FIG. 1) and, therefore, the engagement of the cam shape of retention washer 10 and the internal surface of hub assembly 54 is also configured to prevent or restrict rotation of nut 42 on which retention washer 10 is positioned, about its longitudinal axis 48.

In the example shown in FIG. 4, system 40 includes six retention washers 10 and six corresponding nuts 42 secured to six corresponding studs 44 (not shown in FIG. 4). Generally, system 40 includes a respective retention washer 10 for each respective nut 42/stud 44 pair. Other examples of system 40 may include more retention washers 10 (and accordingly more nuts 42), or fewer retention washers 10 (and accordingly fewer nuts 42). For example, system 40 may include at least two, at least three, at least four, at least five, at least six, at least seven, at least eight, at least nine, at least ten, at least eleven, and/or at least twelve bolts, and a corresponding number of nuts 42 and retention washers 10. Similarly, the example of system 40 shown in FIG. 4 illustrates a circular array of nuts 42 and respective retention washers 10, though this is not meant to be a limiting example. In other examples of system 40, retention washers 10 may be positioned on nuts 42 that are arranged in any arrangement, such as in a linear arrangement, in a two-dimensional array, in a polygonal or other shaped-arrangement, or in any other desired arrangement.

Hub assembly 54 may include a shaft engagement portion 58 that is configured to engage a shaft. Shaft engagement portion 58 may engage a shaft directly or indirectly, through other components of the assembly. In an example, system 40 may be configured to receive an engine shaft or starter shaft within shaft engagement portion 58, in order to drive propeller assembly 52. In the example shown in FIG. 4, studs 44, nuts 42, and retention washers 10 are spaced circumferentially around shaft engagement portion 58 (and thus are spaced circumferentially about any shaft positioned through shaft engagement portion 58). Shaft engagement portion 58 may also engage with retention washers 10, such as via curved cutouts 60. In some examples, shaft engagement portion 58 includes a respective curved cutout 60 for each respective retention washer 10 of system 40. Curved cutouts 60 may be sized and shaped to engage with first lobe 22a of each retention washer 10, as shown in FIG. 4, with curved cutouts 60 being sized and shaped with respect to first lobe 22a so as to substantially prevent or restrict rotation of retention washer 10 about its transverse axis 66 (FIG. 1).

Additionally or alternatively, hub assembly 54 may include a clip, or annular retaining ring 62 (referred to herein as a snap ring 62) engaged with retention washer 10 such that snap ring 62 is configured to restrict and/or prevent axial translation of retention washer 10 with respect to propeller assembly 52 and hub assembly 54, along a longitudinal axis 48 of the shaft (which corresponds to longitudinal axis 48 of studs 44 as well). Snap ring 62 generally is substantially annular in nature and may extend substantially around the circumference of hub assembly 54. The ends of snap ring 62 may be free ends 64, such that snap ring 62 may be widened by separating free ends 64 from one another, and tightened by bringing free ends 64 closer together. Snap ring 62 may be engaged with a plurality of retention washers 10, such as shown in FIG. 4. In this example of system 40, snap ring 62 is engaged with six retention washers 10 and is configured to at least substantially prevent axial translation of all six retention washers 10 along longitudinal axis 48 (FIG. 5). For example, snap ring 62 may be engaged with first side 16 of retention washer 10 (e.g., with first side 16 of each retention washer 10 in system 40). Additionally or alternatively, snap ring 62 may be engaged with retention washer 10 adjacent third edge 34 of retention washer 10, which is illustrated in retention washer 10a in FIG. 4, which shows third edge 34 in dashed line, due to being obscured by snap ring 62.

Because retention washer 10 is configured to prevent or restrict rotation of nut 42 with respect to retention washer 10, because hub assembly 54 is configured to prevent or restrict rotation of retention washer 10 with respect to hub assembly 54, and because snap ring 62 is configured to prevent or restrict axial translation of retention washer 10, system 40 as a whole is configured to retain nut 42 in place on stud 44 and constrain movement of nut 42 in all six degrees of freedom, within a threshold range of prescribed torque. Retention washers 10 generally are configured to retain such installation torque and position of nuts 42 without the use of Loctite, lockwire, or other consumables, though the same may be used if desired in some examples. In this manner, retention washer 10 generally is selectively removable from nut 42 to facilitate selective removal of propeller assembly 52 from the shaft. For example, once snap ring 62 is loosened or removed from hub assembly 54, each respective retention washer 10 may be translated along the respective longitudinal axis 48 of the respective nut 42 with which the respective retention washer 10 is engaged, thereby removing each retention washer 10 from hub assembly 54. Then, each nut 42 may be removed from each stud 44 in the usual manner. Thus, disclosed systems 40 may be configured to allow for selective, reliable, repeatable, and quick changing of propeller assemblies in the field, without requiring specialized tools or skilled labor to perform such changes. Further, retention washers 10 may be configured to be selectively replaceable after removal. For example, if retention washers 10 are removed to remove propeller assembly 52 from a shaft, the same retention washers 10 may be used again to secure a different propeller assembly to the shaft.

In some examples, retention washer 10 includes a visual indication that it is installed correctly. In other words, retention washer 10 may be configured to provide a visual cue that it is installed correctly. For example, a visual inspection that verifies that retention washer 10 is positioned on nut 42 may be sufficient to verify that retention washer 10 is installed properly, and/or retention washer 10 may be shaped and sized with respect to hub assembly 54 so as to prevent incorrect installation. For example, the size and shape of retention washer 10 may prevent it from being installed upside down because the shaft would prevent the ability of retention washer 10 to be axially slid onto nut 42 if third edge 34 was positioned radially inward as opposed to the configuration shown where third edge 34 of each retention washer 10 is positioned radially outward from first and second edges 30, 32. In other words, in the example shown in FIG. 4, retention washer 10 is configured to be installed on nut 42 such that first lobe 22a is closest to the shaft (and positioned within curved cutout 60), and the shape of retention washer 10 may be configured to prevent installation of retention washer 10 in such a way that a different lobe is closest to the shaft. In other examples, retention washer 10 may include one or more alignment markings or other indications to verify its alignment and positioned with respect to nut 42 and/or hub assembly 54.

Propeller assembly 52 may be any propeller assembly, such as may be used on any type of aircraft, including unmanned aerial vehicles (UAVs or drones). In other examples, system 40 may be used to retain nuts on fasteners in other applications, such as in nuclear, transmission joint, submarine, marine, and/or medical applications.

Figure 7:
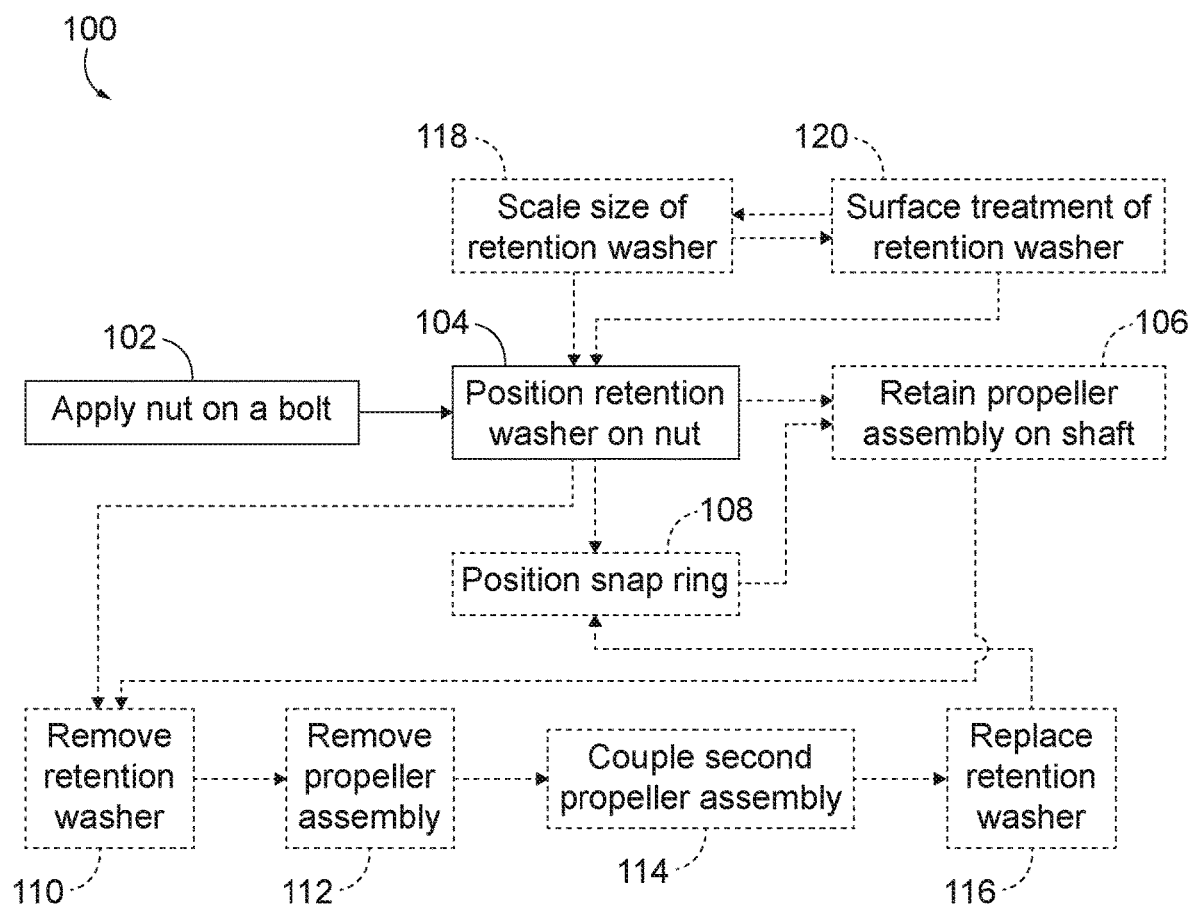
FIG. 7 is a schematic, flowchart diagram of methods according to the present disclosure.

FIG. 7 schematically provides a flowchart that represents illustrative, non-exclusive examples of methods 100 according to the present disclosure. In FIG. 7, some steps are illustrated in dashed boxes indicating that such steps may be optional or may correspond to an optional version of methods 100 according to the present disclosure. That said, not all methods 100 according to the present disclosure are required to include the steps illustrated in solid boxes. The methods 100 and steps illustrated in FIG. 7 are not limiting and other methods and steps are within the scope of the present disclosure, including methods having greater than or fewer than the number of steps illustrated, as understood from the discussions herein.

Methods 100 generally include applying a nut (e.g., nut 42) onto a bolt (e.g., stud 44) within a predetermined range of a prescribed installation torque, at 102, and then positioning a retention washer (e.g., retention washer 10) with respect to the nut, at 104. In positioning the retention washer at 104, the retention washer is placed on the nut such that the hole of the retention washer (e.g., hole 14) circumscribes the nut and thereby limits rotation of the nut with respect to the bolt. In this manner, as described above, the retention washer may maintain the nut on the bolt at a torque within the predetermined range of the prescribed installation torque. Applying the nut onto the bolt at 102 generally is performed without the use of Loctite, lockwire, or other consumables, though some methods 100 may include the application of such items. Such methods 100 may be methods 100 of propeller retention (e.g., presently disclosed retention washers may be used to retain nuts on a bolt that is part of an assembly used to maintain a propeller assembly on a shaft). Thus, methods 100 may include retaining the propeller assembly on the shaft via the nut and bolt, at 106. Of course, disclosed methods 100 may alternatively be used to position the disclosed retention washers for other purposes as well, such as for maintaining a nut's torque and position with respect to a bolt in any number of different industries and applications.

In some examples, positioning the retention washer at 104 includes translating the retention washer axially along a longitudinal axis of the bolt (e.g., longitudinal axis 48). Additionally or alternatively, positioning the retention washer at 104 may include engaging the third edge of the retention washer (e.g., third edge 34) with a machined bore of the propeller assembly and thereby restrict rotation of the retention washer with respect to the propeller assembly. In some methods 100, applying the nut onto the bolt at 102 includes applying a plurality of respective nuts onto a plurality of respective bolts. In these examples, positioning the retention washer at 104 includes positioning a plurality of respective retention washers such that a respective retention washer is positioned on each respective nut.

Methods 100 may include positioning a snap ring (e.g., snap ring 62) with respect to the retention washer, at 108, such that the snap ring is configured to restrict and/or prevent axial translation of the retention washer (e.g., along longitudinal axis 48) with respect to the propeller assembly, the nut, and/or the bolt. For example, positioning the snap ring at 108 may include engaging the snap ring with one side of the retention washer (e.g., first side 16), such that the snap ring secures the retention washer axially. In some examples, the snap ring may contact, or press against, the retention washer. Additionally or alternatively, the snap ring may be positioned at 108 to sandwich a portion of the retention washer (e.g., an area along and adjacent third edge 34) between the snap ring and another component of a hub assembly or other assembly. In some methods, positioning the snap ring at 108 may include positioning just one snap ring, even in examples utilizing a plurality of retention washers. For example, a single snap ring may be positioned with respect to a plurality of retention washers such that the snap ring prevents and/or restricts axial translation of the plurality of retention washers. In other examples, positioning the snap ring at 108 may include positioning a plurality of snap rings, or other structures configured to restrict axial translation of the retention washer or washers.

Methods 100 may include selectively removing the retention washer from the nut at 110 (or selectively removing a plurality of respective retention washers from a plurality of respective nuts). In some examples, removing the retention washer at 110 includes first removing any snap rings or other structures that were placed to limit axial movement of the retention washer. In this manner, removing the retention washer at 110 may simply involve axially sliding the retention washer off of the nut by translating the retention washer away from the nut along the longitudinal axis of the nut/bolt. Once the retention washer is removed at 110, the propeller assembly may be selectively removed from the shaft at 112 (or another type of assembly may be removed from a shaft or sub-assembly at 112). A different, second propeller assembly (or other type of assembly) may be coupled to the shaft at 114 according to some methods 100, which may be performed using the same nuts and bolts as with the previous propeller assembly, or may be performed using different nuts and bolts. Once the second propeller assembly is coupled to the shaft at 114, the retention washer (or plurality of retention washers) may again be positioned on the nut (or nuts), at 116, to retain the second propeller assembly on the shaft. In this manner, presently disclosed retention washers may be used to secure different setups or propeller assemblies on a given shaft, allowing for removal and change-out of propeller assemblies in an efficient manner without requiring specialized tools.

Advantageously, disclosed retention washers may be configured to be readily scaled up or down in size to accommodate larger or smaller propeller assemblies. Accordingly, methods 100 may include scaling up the size of the retention washer and/or scaling down the size of the retention washer, at 118. In some examples, a given propeller assembly may employ two or more different sizes of retention washers, and/or a given aircraft may include two or more different sizes of retention washers.

Additionally or alternatively, methods 100 may include performing one or more surface treatments of the retention washer, at 120. For example, surface treating the retention washer at 120 may include texturing the first side and/or the second side of the retention washer, performing surface abrasion on the first side and/or the second side of the retention washer, and/or applying a surface coating to the first side and/or the second side of the retention washer. In a specific example, surface treating the retention washer at 120 may include applying a nitrate bath coating to the first side and/or the second side of the retention washer. In this manner, disclosed retention washers may be customized to increase or decrease the hardness of the retention washers, which may increase the retention washer's effectiveness and/or service life.

Illustrative, non-exclusive examples of inventive subject matter according to the present disclosure are described in the following enumerated paragraphs:

A1. A retention washer, comprising:
a washer body, comprising:
a first side; and
a second side opposite the first side, wherein the washer body has a perimeter having one or more lobes; and
a hole extending through the washer body from the first side to the second side, wherein the hole is a multi-point star-shaped hole, wherein the retention washer is configured to maintain an installation torque of an installed nut when the retention washer is positioned such that the hole circumscribes the installed nut.

A1.1. The retention washer of paragraph A1, wherein the multi-point star-shaped hole is a 24-point star-shaped hole.

A2. The retention washer of paragraph A1 or A1.1, wherein an inner diameter of the hole is sized with respect to the installed nut such that the hole is slightly bigger than an outer diameter of the installed nut.

A3. The retention washer of any of paragraphs A1-A2, wherein the wherein the perimeter has a first radius of curvature corresponding to a first lobe of the one or more lobes.

A4. The retention washer of any of paragraphs A1-A3, wherein the perimeter has a second radius of curvature corresponding to a second lobe of the one or more lobes.

A5. The retention washer of any of paragraphs A1-A4, wherein the perimeter has a third radius of curvature corresponding to a third lobe of the one or more lobes.

A6. The retention washer of any of paragraphs A1-A5, wherein a/the second radius of curvature of the perimeter is at least substantially equal to a/the third radius of curvature of the perimeter.

A7. The retention washer of any of paragraphs A1-A6, wherein a/the first radius of curvature of the perimeter is different from a/the third radius of curvature and a/the second radius of curvature of the perimeter.

A8. The retention washer of any of paragraphs A1-A7, wherein a center point of the hole is at least substantially equidistant from a second center of a/the second radius of curvature and from a third center of a/the third radius of curvature of the perimeter.

A9. The retention washer of any of paragraphs A1-A8, wherein a/the center point of the hole is closer to a first center of a/the first radius of curvature of the perimeter than to a/the second center of a/the second radius of curvature or to a/the third center of a/the third radius of curvature.

A10. The retention washer of any of paragraphs A1-A9, wherein the perimeter comprises a first edge between a/the first radius of curvature and a/the second radius of curvature.

A11. The retention washer of any of paragraphs A1-A10, wherein the perimeter comprises a second edge between a/the first radius of curvature and a/the third radius of curvature.

A12. The retention washer of paragraph A10 and A11, wherein a first length of the first edge is at least approximately equal to a second length of the second edge.

A13. The retention washer of any of paragraphs A1-A12, wherein the perimeter comprises a third edge between a/the second radius of curvature and a/the third radius of curvature.

A14. The retention washer of paragraph A13, wherein a third length of the third edge is greater than a/the first length of a/the first edge and/or greater than a/the second length of a/the second edge.

A15. The retention washer of any of paragraphs A1-A14, wherein a/the first radius of curvature corresponds to a/the first lobe of the washer body, wherein the first lobe of the washer body is configured to engage an external structure and thereby restrict and/or prevent rotation of the retention washer with respect to the external structure.

A16. The retention washer of any of paragraphs A1-A15, wherein a/the first radius of curvature corresponds to a/the first lobe of the washer body, wherein the first lobe of the washer body is configured to engage an/the external structure and thereby restrict and/or prevent rotation of the retention washer about a transverse axis extending through the hole.

A17. The retention washer of any of paragraphs A1-A16, wherein a/the first radius of curvature corresponds to a/the first lobe of the washer body, wherein the first lobe of the washer body is configured to act as a cam edge.

A18. The retention washer of any of paragraphs A1-A17, wherein the retention washer is configured to restrict and/or prevent rotation of the installed nut with respect to the retention washer.

A19. The retention washer of any of paragraphs A1-A18, wherein the retention washer is configured to maintain the installation torque of the installed nut when the retention washer is positioned to circumscribe the installed nut, without the use of Loctite, lockwire, or other consumables.

A20. The retention washer of any of paragraphs A1-A19, wherein the first side is surface treated to increase hardness and/or reduce or prevent wear.

A21. The retention washer of any of paragraphs A1-A20, wherein the second side is surface coated and/or is textured to increase hardness and/or reduce or prevent wear.

A22. The retention washer of any of paragraphs A1-A21, wherein a/the transverse axis extending through a center point of the hole is at least substantially concentric with an axis of rotation of the installed nut.

A23. The retention washer of any of paragraphs A1-A22, wherein a washer center point of the retention washer is different from a/the center point of the hole.

A24. The retention washer of any of paragraphs A1-A23, wherein the washer body comprises stainless steel, steel, aluminum, a plastic, a composite material, and/or metal alloys.

B1. A system for retention of a propeller assembly on a shaft, the system comprising:
  a nut installed on a bolt, wherein the nut and the bolt are configured to retain the propeller assembly on the shaft; and
  a retention washer positioned such that a hole of the retention washer circumscribes the nut, thereby limiting rotation of the nut with respect to the bolt and retaining the nut on the bolt, wherein the retention washer is the retention washer of any of paragraphs A1-A24.

B2. The system of paragraph B1, wherein the retention washer is configured to slide over an outer surface of the nut.

B2.1. The system of paragraph B1 or B2, wherein the retention washer is configured to be translated axially along a longitudinal axis of the bolt to position the retention washer on the nut.

B3. The system of any of paragraphs B1-B2.1, wherein the retention washer is configured such that rotation of the retention washer with respect to the nut is restricted once the retention washer is positioned such that it circumscribes the nut.

B4. The system of any of paragraphs B1-B3, wherein the shaft is an engine shaft.

B5. The system of any of paragraphs B1-B4, further comprising a hub assembly engaged with the propeller assembly, wherein the hub assembly comprises a machined bore, and wherein the retention washer is configured such that engagement of a/the third edge of the retention washer with the machined bore is configured to restrict and/or prevent rotation of the retention washer with respect to the hub assembly.

B6. The system of any of paragraphs B1-B5, wherein the nut installed on the bolt comprises a plurality of nuts installed on a plurality of bolts, wherein each respective nut of the plurality of nuts is installed on a respective bolt of the plurality of bolts.

B7. The system of paragraph B6, wherein the plurality of bolts are spaced circumferentially about the shaft.

B7.1. The system of paragraph B6 or B7, wherein the plurality of bolts comprises a circular array of bolts.

B7.2. The system of any of paragraphs B6-B7.1, wherein the plurality of bolts comprises at least two, at least three, at least four, at least five, at least six, at least seven, at least eight, at least nine, at least ten, at least eleven, and/or at least twelve bolts.

B8. The system of any of paragraphs B6-B7.2, wherein the retention washer comprises a plurality of retention washers, and wherein each respective nut of the plurality of nuts has a respective retention washer positioned thereon.

B9. The system of any of paragraphs B1-B8, further comprising a snap ring engaged with the retention washer such that the snap ring is configured to restrict and/or prevent axial translation of the retention washer with respect to the propeller assembly, along a longitudinal axis of the shaft.

B10. The system of paragraph B8 and B9, wherein the snap ring is engaged with the plurality of retention washers such that the snap ring is configured to restrict and/or prevent axial translation of the plurality of retention washers with respect to the propeller assembly, along the longitudinal axis of the shaft.

B11. The system of any of paragraphs B9-B10, wherein the snap ring is configured to engage a/the first side of the retention washer.

B12. The system of any of paragraphs B9-B11, wherein the snap ring is configured to engage the retention washer adjacent a/the third edge of the retention washer.

B13. The system of any of paragraphs B1-B12, wherein the retention washer is configured to retain the nut on the bolt without Loctite, lockwire, or other consumables.

B14. The system of any of paragraphs B1-B13, wherein the nut has an outer perimeter with a polygonal cross-sectional shape.

B15. The system of any of paragraphs B1-B14, wherein the nut is a 12-point nut.

B16. The system of any of paragraphs B1-B15, wherein the retention washer is configured to maintain a prescribed torque on the nut.

B17. The system of paragraph B16, wherein the prescribed torque is within 5% of an installation torque of the nut.

B18. The system of any of paragraphs B1-B17, wherein the retention washer is configured to restrict and/or prevent rotation of the nut more than 7.8 degrees with respect to the bolt.

B19. The system of any of paragraphs B1-B18, wherein the retention washer is configured to be selectively removable to facilitate selective removal of the propeller assembly from the shaft.

B20. The system of any of paragraphs B1-B19, wherein the retention washer is configured to be selectively replaceable after selective removal.

B21. The system of any of paragraphs B1-B20, wherein the retention washer is configured to provide a visual cue that it is installed correctly.

B22. The system of any of paragraphs B1-B21, wherein the nut engages with the hole of the retention washer and wherein the nut is not engaged with the first side or a/the second side of the retention washer.

B23. The system of any of paragraphs B1-B22, wherein the retention washer is configured to constrain the nut in six degrees of freedom.

C1. An aircraft comprising the retention washer of any of paragraphs A1-A24.

C2. An aircraft comprising the system of any of paragraphs B1-B23.

C3. The aircraft of paragraph C1 or C2, wherein the aircraft is a UAV.

D1. A method of propeller retention, the method comprising:
  applying a nut onto a bolt within a predetermined range of a prescribed installation torque; and
  positioning a retention washer with respect to the nut such that a hole of the retention washer circumscribes the nut, thereby limiting rotation of the nut with respect to the bolt and maintaining the nut at a torque within the predetermined range of the prescribed installation torque.

D2. The method of paragraph D1, wherein the retention washer is the retention washer of any of paragraphs A1-A24.

D3. The method of any of paragraphs D1-D2, wherein the positioning the retention washer comprises translating the retention washer axially along a longitudinal axis of the bolt.

D4. The method of any of paragraphs D1-D3, further comprising retaining a propeller assembly on a shaft, via the nut and the bolt.

D5. The method of any of paragraphs D1-D4, wherein the positioning the retention washer comprises engaging a/the third edge of the retention washer with a machined bore of a/the hub assembly, thereby restricting rotation of the retention washer with respect to the propeller assembly.

D6. The method of any of paragraphs D1-D5, wherein the applying the nut onto the bolt comprises applying a respective nut of a plurality of nuts onto a respective bolt of a plurality of bolts, and wherein the positioning the retention washer comprises positioning a respective retention washer on each respective nut of the plurality of nuts.

D7. The method of any of paragraphs D1-D6, further comprising positioning a snap ring with respect to the retention washer such that the snap ring is configured to restrict and/or prevent axial translation of the retention washer with respect to a/the propeller assembly.

D8. The method of paragraph D7, wherein the positioning the snap ring comprises engaging the snap ring with a/the first side of the retention washer.

D9. The method of any of paragraphs D1-D8, wherein the applying the nut onto the bolt is performed without use of Loctite, lockwire, and/or other consumables.

D10. The method of any of paragraphs D1-D9, further comprising selectively removing the retention washer from the nut.

D11. The method of paragraph D10, further comprising removing a/the propeller assembly from a/the shaft after the selectively removing the retention washer from the nut.

D12. The method of paragraph D11, wherein the propeller assembly is a first propeller assembly, and wherein the method further comprises:
  coupling a second propeller assembly to the shaft via the nut and the bolt; and
  replacing the retention washer onto the nut.

D13. The method of any of paragraphs D1-D12, further comprising scaling up a size of the retention washer for retention of larger propeller assemblies.

D14. The method of any of paragraphs D1-D13, further comprising scaling down a/the size of the retention washer for retention of smaller propeller assemblies.

D15. The method of any of paragraphs D1-D14, further comprising texturing a/the first side and/or a/the second side of the retention washer.

D16. The method of paragraph D15, wherein the texturing comprises surface abrasion of the first side and/or the second side of the retention washer.

D17. The method of any of paragraphs D1-D16, further comprising surface coating a/the first side and/or a/the second side of the retention washer.

D18. The method of paragraph D17, wherein the surface coating comprises applying a nitrate bath coating to the first side and/or the second side of the retention washer.

E1. The use of the retention washer of any of paragraphs A1-24 to retain a nut on a bolt.

E2. The use of the retention washer of any of paragraphs A1-A24 to retain a propeller assembly on a shaft.

E3. The use of the system of any of paragraphs B1-B23 to retain a propeller assembly on a shaft.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the term "restrict," as used to describe a mechanism or action in opposition to a process or outcome, is intended to indicate that the mechanism or action operates to at least substantially, and optionally fully, diminish, block, and/or preclude the process or outcome from proceeding and/or being completed. As examples, the use of the term "restrict," such as in describing a mechanism as restricting is intended to indicate that the mechanism selectively prevents, impedes, blocks, obstructs, and/or otherwise substantially limits an ability of the retention washer to rotate without damage to the retention washer or system. As used herein, the term "prevent," as used to describe a mechanism or action in opposition to a process or outcome, is intended to indicate that the mechanism or action operates to fully block and/or preclude the process or outcome from proceeding and/or being completed during operative use of the structures and components according to the present disclosure. Stated differently, as used herein, the term "prevent" is not intended to indicate that the mechanism or action will fully block and/or preclude the process or outcome from proceeding and/or being completed in all possible uses, but rather is intended to indicate that the process or outcome is prevented at least when the structures and components disclosed herein are utilized in a manner consistent with the present disclosure.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure.

The invention claimed is:

1. A propeller assembly, comprising:
   a plurality of studs;
   a plurality of nuts, wherein each respective nut of the plurality of nuts is installed on a respective stud of the plurality of studs, wherein the plurality of nuts and the plurality of studs are configured to retain the propeller assembly on a shaft;
   a plurality of retention washers, wherein each respective retention washer of the plurality of retention washers is positioned such that a hole of the respective retention washer circumscribes a respective nut of the plurality of nuts, such that the respective washer limits rotation of the respective nut with respect to a respective stud and retains the respective nut on the respective stud, wherein each retention washer comprises:
      a washer body, comprising:
         a first side; and
         a second side opposite the first side, wherein the washer body has a perimeter having one or more lobes; and
      the hole extending through the washer body from the first side to the second side, wherein the hole is a multi-point star-shaped hole, wherein each respective retention washer is configured to maintain an installation torque of the respective nut via engagement between the hole and the respective nut when the respective retention washer is positioned such that the hole circumscribes the respective nut; and
   a hub assembly engaged with a propeller of the propeller assembly, wherein the hub assembly comprises a machined bore, wherein a portion of the perimeter of each retention washer of the plurality of retention washers is engaged with an internal surface of the machined bore such that the machined bore restricts rotation of each retention washer with respect to the hub assembly, and wherein the plurality of retention washers are configured to retain the hub assembly on a shaft of the propeller assembly.

2. The propeller assembly according to claim 1, wherein each respective retention washer of the plurality of retention washers is configured to be translated axially along a longitudinal axis of the respective stud to position the respective retention washer on the respective nut.

3. The propeller assembly according to claim 1, wherein the plurality of studs comprises a circular array of studs spaced circumferentially about the shaft.

4. The propeller assembly according to claim 1, further comprising a snap ring engaged with the plurality of retention washers such that the snap ring is configured to restrict axial translation of the plurality of retention washers with respect to the hub assembly along a longitudinal axis of the shaft, wherein the snap ring is substantially annular and extends substantially around a circumference of the hub assembly, and wherein the snap ring engages the first side of each retention washer of the plurality of retention washers.

5. The propeller assembly according to claim 1, wherein each nut of the plurality of nuts is a 12-point nut, wherein each retention washer of the plurality of retention washers is configured to maintain a prescribed torque on a respective nut of the plurality of nuts, wherein the prescribed torque is within 5% of the installation torque of the respective nut, and wherein each retention washer of the plurality of retention washers is configured to prevent rotation of the respective nut of more than 7.8 degrees with respect to a respective stud of the plurality of studs.

6. The propeller assembly according to claim 1, wherein each retention washer of the plurality of retention washers is selectively removable to facilitate selective removal of the hub assembly from the shaft, and wherein each retention washer of the plurality of retention washers is selectively replaceable after selective removal.

7. The propeller assembly according to claim 1, wherein each respective nut of the plurality of nuts is only engaged with the hole of a respective retention washer of the plurality of retention washers such that the respective nut does not engage or contact the first side or the second side of the respective retention washer.

8. A method of propeller retention, the method comprising:
applying a nut onto a stud within a predetermined range of a prescribed installation torque, wherein the nut and the stud retain a propeller assembly on a shaft; and
positioning a retention washer with respect to the nut such that a hole of the retention washer circumscribes the nut, thereby limiting rotation of the nut with respect to the stud and maintaining the nut at a torque within the predetermined range of the prescribed installation torque, wherein the positioning the retention washer comprises translating the retention washer axially along a longitudinal axis of the stud, and wherein the retention washer comprises:
a washer body, comprising:
a first side; and
a second side opposite the first side, wherein the washer body has a perimeter having at least a first lobe, a second lobe, and a third lobe, wherein the perimeter has a first radius of curvature corresponding to the first lobe, wherein the perimeter has a second radius of curvature corresponding to the second lobe, and wherein the perimeter has a third radius of curvature corresponding to the third lobe; and
the hole extending through the washer body from the first side to the second side, wherein the hole is a multi-point star-shaped hole, wherein the retention washer maintains an installation torque of the nut via engagement between the hole and the nut when the retention washer is positioned such that the hole circumscribes the nut, wherein a center point of the hole is closer to a first center of the first radius of curvature of the perimeter than to a second center of the second radius of curvature or to a third center of the third radius of curvature, and wherein the retention washer is selectively removable from the nut to facilitate selective removal of the nut, and wherein the retention washer is selectively replaceable after selective removal.

9. The method according to claim 8, further comprising:
selectively removing the retention washer from the nut;
removing the propeller assembly from the shaft after the selectively removing the retention washer from the nut, wherein the propeller assembly is a first propeller assembly;
coupling a second propeller assembly to the shaft via the nut and the stud; and
replacing the retention washer onto the nut.

* * * * *

UNITED STATES PATENT AND TRADEMARK OFFICE
CERTIFICATE OF CORRECTION

| | | |
|---|---|---|
| PATENT NO. | : 12,104,641 B2 | Page 1 of 1 |
| APPLICATION NO. | : 16/909027 | |
| DATED | : October 1, 2024 | |
| INVENTOR(S) | : Chad Nichols Blundell | |

It is certified that error appears in the above-identified patent and that said Letters Patent is hereby corrected as shown below:

On the Title Page

At Item "(71) Applicant," the text should be changed to --INSITU, INC., a subsidiary of THE BOEING COMPANY, Bingen, WA (US)--.

Signed and Sealed this
Twelfth Day of November, 2024

Katherine Kelly Vidal
*Director of the United States Patent and Trademark Office*